United States Patent
Kim et al.

(10) Patent No.: US 7,558,001 B2
(45) Date of Patent: Jul. 7, 2009

(54) COMPACT ZOOM LENS

(75) Inventors: Sung-woo Kim, Uiwang-si (KR); Yong-nam Kim, Uiwang-si (KR)

(73) Assignee: Samsung Techwin Co., Ltd., Changwon (KR)

(*) Notice: Subject to any disclaimer, the term of this patent is extended or adjusted under 35 U.S.C. 154(b) by 0 days.

(21) Appl. No.: 11/725,308

(22) Filed: Mar. 19, 2007

(65) Prior Publication Data

US 2008/0062531 A1 Mar. 13, 2008

(30) Foreign Application Priority Data

Sep. 13, 2006 (KR) .................. 10-2006-0088700

(51) Int. Cl.
*G02B 15/14* (2006.01)

(52) U.S. Cl. ........................ 359/676; 359/695

(58) Field of Classification Search ............... 359/676, 359/684, 686, 681, 695, 771, 776, 781
See application file for complete search history.

(56) References Cited

U.S. PATENT DOCUMENTS

| | | | |
|---|---|---|---|
| 2003/0193722 A1* | 10/2003 | Mihara | 359/684 |
| 2004/0066561 A1* | 4/2004 | Nagata et al. | 359/676 |
| 2004/0105020 A1 | 6/2004 | Iwasawa | |

FOREIGN PATENT DOCUMENTS

| | | |
|---|---|---|
| JP | 03-228008 A | 10/1991 |
| JP | 2003-043354 A | 2/2002 |
| JP | 2003-202500 A | 7/2003 |
| JP | 2004-163477 A | 6/2004 |
| JP | 2004-348082 A | 12/2004 |
| JP | 2005-266175 A | 9/2005 |
| JP | 2006-58363 A | 3/2006 |
| JP | 2006-106089 A | 4/2006 |

* cited by examiner

*Primary Examiner*—Alicia M Harrington
(74) *Attorney, Agent, or Firm*—Drinker Biddle & Reath LLP

(57) ABSTRACT

A compact zoom lens includes first, second, third, and fourth lens groups sequentially arranged from an object side. The first lens group includes a first lens and at least one reflection optical component and at least the third lens group moves during zooming. The zoom lens satisfies a condition that $0.22 \leq ST3/OL \leq 0.25$ where "ST3" is the distance of movement of the third lens group from a wide angle position to a telephoto position and "OL" is the overall length of the zoom lens. The compact zoom lens embodies a folding type inner zoom to reduce the thickness and the length of the zoom lens so it is suitable for use in digital cameras as well as personal mobile devices.

29 Claims, 10 Drawing Sheets (a)

(WIDE MODE)

(b)

(MIDDLE MODE)

(c)

(TELE MODE)

(a)

(WIDE MODE)

(b)

(MIDDLE MODE)

(c)

(TELE MODE)

(a)

(WIDE MODE)

(b)

(MIDDLE MODE)

(c)

(TELE MODE)

COMPACT ZOOM LENS

CROSS-REFERENCE TO RELATED PATENT APPLICATIONS

This application claims the benefit of Korean Patent Application No. 10-2006-0088700, filed on Sep. 13, 2006, in the Korean Intellectual Property Office, the disclosure of which is incorporated herein in its entirety by reference.

BACKGROUND OF THE INVENTION

1. Field of the Invention

The present invention relates to a compact zoom lens using a folding type inner zoom lens.

2. Description of the Related Art

As the popularity of electronic devices such as personal digital assistants (PDAs) and mobile information units increases, digital cameras or digital video units are included in the electronic device and accordingly the demand for the miniaturization of the camera module increases. Further, providing a zoom camera in such mobile units is increasing. To satisfy the demand, a zoom lens that is ultra-compact compared to a zoom lens used for a general camera is needed. The zoom lens installed on mobile devices has much more restrictions on size compared to the zoom lens installed on digital cameras. That is, in a digital camera, typically only the minimum thickness needs to be considered whereas in a mobile device the size of height and width in addition to the thickness must be made as compact as possible. In order to make a compact zoom lens by reducing the thickness in a digital camera, a optical system that is of a folding type and simultaneously has an inner zoom lens is widely used.

U.S. Patent Publication No. 2004-0105020 A1 discloses an example of the above optical system which includes first through fourth lens groups to embody a compact zoom lens. In general, to harmonize an inner zoom type and a folding type, the first lens group includes a reflection optical component and the first lens group needs to be fixed during zooming or magnification. In general, the second lens group has a negative refractive power and moves during the zooming or magnification so as to function as a variator. The third lens group has a positive refractive power and moves during zooming or magnification so as to function as a compensator. The fourth lens group performs focusing for a structure moving during the zooming or magnification to additionally function as a compensator. In the above structure, the second and third lens groups are driven by a cam while the fourth lens group uses an additional drive motor.

When an optical system in which the fourth lens group is fixed during zooming or magnification is used, the third lens group mainly performs focusing. In this case, the drive motor is connected to each of the second and third lens groups. The second lens group may perform focusing. In this case, however, since the viewing angle of the overall optical system changes, the second lens group is used as a focusing lens only for a special case, for example, for macro photographing. In this case, a stop is located between the second and third lens groups and in most cases the brightness of a lens is maintained by fixing the aperture stop. That is, during zooming or magnification, the second lens group is moved from an object toward the aperture stop while the third lens group is moved from an image side toward the aperture stop.

Japanese Patent Publication No. 2003-202500, as shown in FIG. 1, discloses a zoom lens optical system having first through fifth lens groups Gr1, Gr2, Gr3, Gr4, and Gr5. In detail, the first lens group has a positive refractive power and a reflection optical component, the second lens group has a negative refractive power, the third lens group has an aperture stop and a positive refractive power, the fourth lens group has a positive refractive power, and the fifth lens group has a positive refractive power. In the optical system configured as above, performance is improved by adding a lens in front or rear of an aperture stop ST to correct spherical aberration. That is, the aperture stop functions as a lens group.

During the zooming or magnification from a wide to a telephoto position, the second lens group moves from the object toward an image side and the fourth lens group moves from the image side toward the object while the first, third, and fifth lens groups are fixed. The second lens group functions as a variator while the fourth lens group functions as a compensator. Also, the fourth lens group moves from the image side to the object and simultaneously performs focusing.

However, although the above-described conventional zoom lenses may contribute to the reduction of the thickness of a camera, they have a disadvantage in that they are not suitable for environments with further constraints on reduced height and width.

SUMMARY OF THE INVENTION

To solve the above and other problems, the present invention provides a compact zoom lens which can be appropriately installed in a mobile device by reducing not only the thickness but also the length.

According to an aspect of the present invention, a compact zoom lens comprises first, second, third, and fourth lens groups sequentially arranged from an object side, wherein the first lens group comprises a first lens and at least one reflection optical component, at least the third lens group moves during zooming or magnification, and the zoom lens satisfies the condition that $0.22 \leqq ST3/OL \leqq 0.25$, wherein "ST3" is the distance of movement of the third lens group from a wide angle position to a telephoto position and "OL" is the overall length of the zoom lens.

According to another aspect of the present invention, a compact zoom lens comprises a first lens group having a negative refractive power, a second lens group having a negative refractive power, a third lens group having a positive refractive power, and a fourth lens group having a positive refractive power sequentially arranged from an object side, wherein at least one lens group moves during the zooming or magnification from a wide angle position to a telephoto position and the first lens group comprises a first lens having at least one aspheric surface from the object side and a reflection optical component.

The first lens may have a refractive index satisfying a range that $1.8 < nd(L1) < 2.0$, where "nd(L1)" indicates a refractive index of the first lens.

During zooming or magnification, the interval between the second and third lens groups may increase and the interval between the third and fourth lens groups may decrease.

During zooming or magnification, the second, third, and fourth lens groups may move.

The first lens may have a meniscus shape.

The fourth lens group may move to perform focusing.

The second lens group may be formed by combining a lens having a negative refractive power and a lens having a positive refractive power in order from the object side.

The second lens group may include at least one plastic lens.

The third lens group may comprise an aperture stop and a combination lens formed by combining a lens having a positive refractive power and a lens having a negative refractive power in order from the object side.

The combination lens may be formed by combining a double convex lens and a double concave lens.

The double convex lens and double concave lens respectively may have the refractive indexes of (nd(C1)) and (nd(C2)) satisfying that $1.5<nd(C1)<1.7$ and $1.8<nd(C2)<2.0$.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
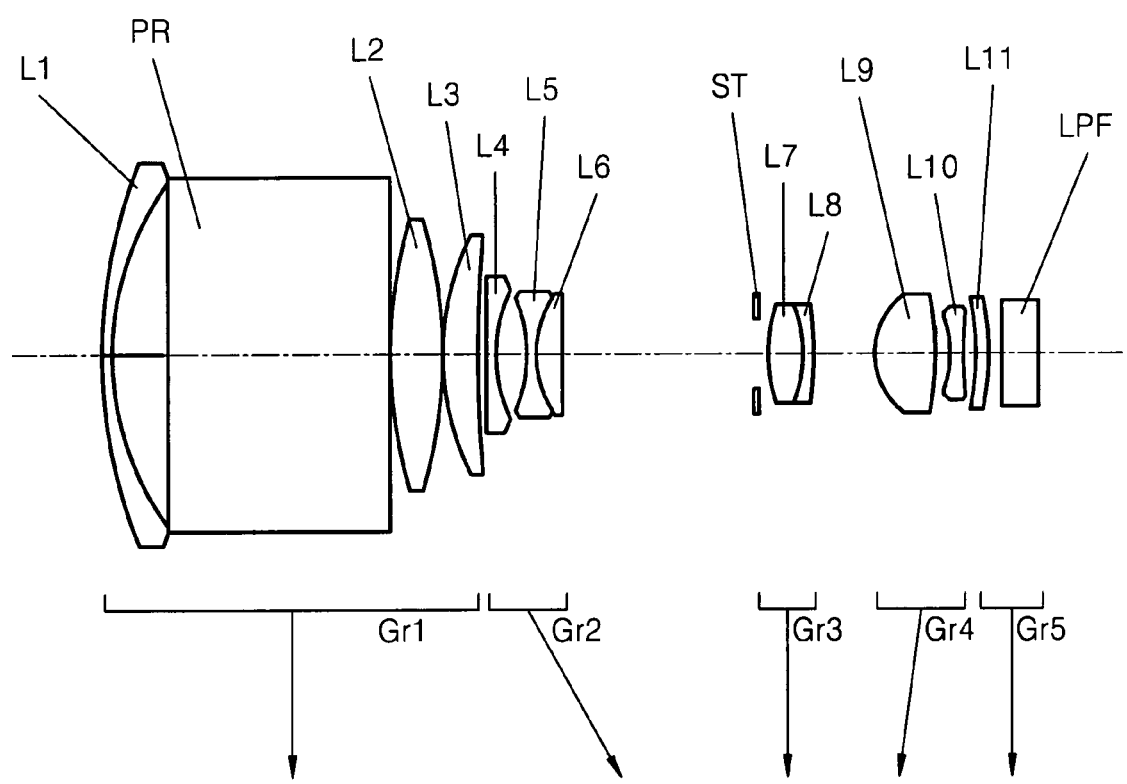
FIG. 1 is a view of the zoom lens used for a digital camera disclosed in Japanese Patent Publication No. 2003-202500.
Figure 2:
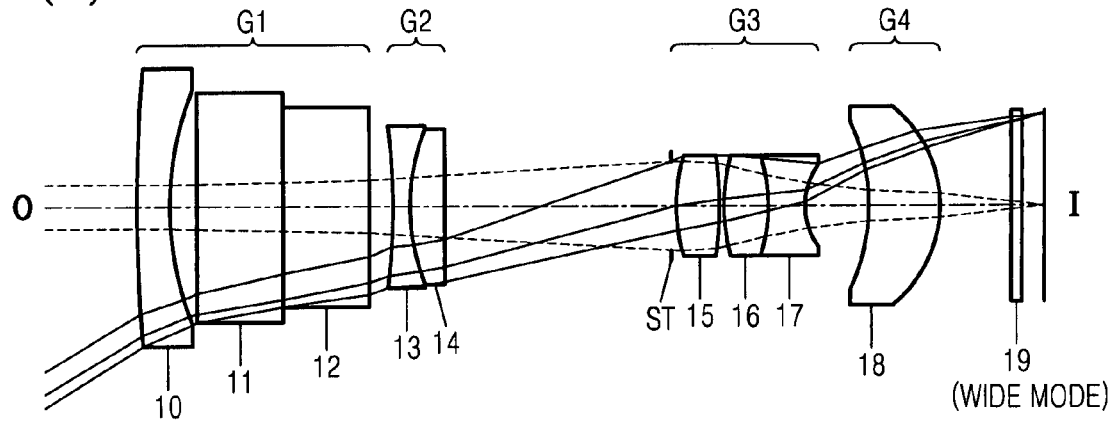
FIG. 2 is a view showing the positions of lenses of a compact zoom lens according to an embodiment of the present invention in a wide angle position, a middle angle position, and a telephoto position.
Figure 2:
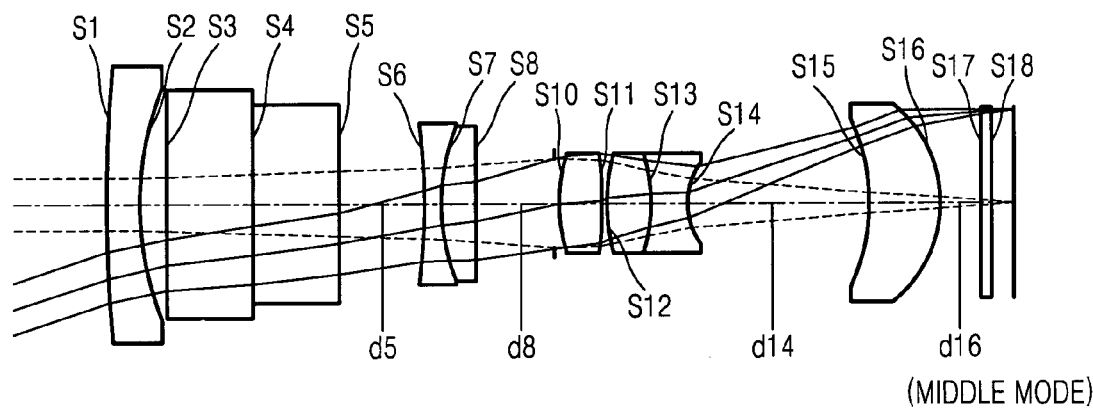
Figure 2:
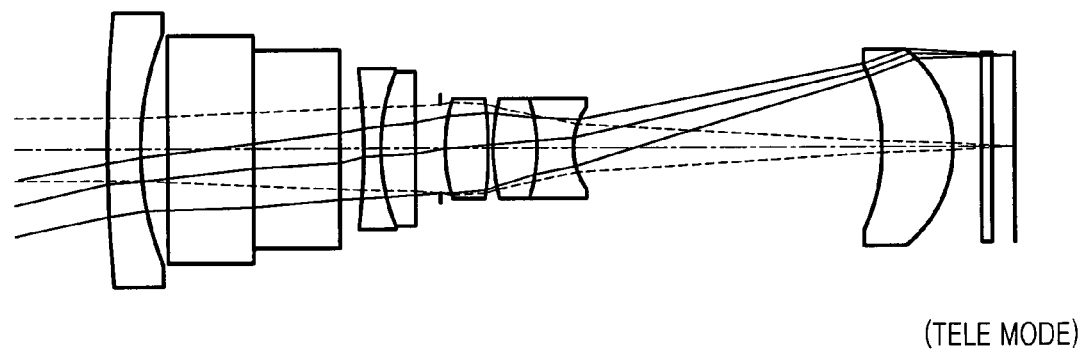

Referring to FIG. 2, a compact zoom lens according to an embodiment of the present invention includes first, second, third, and fourth lens groups G1, G2, G3, and G4 to embody a folding type inner zoom. At least one of the lens groups moves during the change of magnification from a wide angle position to a telephoto position. The zoom lens includes a first lens group G1 having a negative refractive power, a second lens group G2 having a negative refractive power, a third lens group G3 having a positive refractive power and an aperture stop ST, and a fourth lens group G4 having a positive refractive power, which are sequentially arranged from an object side O to an image side I.

During the change of magnification, at least one of the lens groups moves and at least the third lens group moves. For example, the second, third, and fourth lens groups G2, G3, and G3 can move together. The second lens group G2 moves from the object side O to the image side I and then moves toward the object side O. The third lens group G3 moves from the image side I toward the object side O. The amount of movement of the third lens group G3 is relatively large. The fourth lens group G4 moves in the opposite direction to the direction of the third lens group G3, that is, from the object side O toward the image side I. Accordingly, as the movement space of the third lens group overlaps the movement space of the second and fourth lens groups, the maximum magnification change effect can be obtained in a narrow space and the length of the zoom lens can be reduced.

The second and third lens groups G2 and G3 can be moved by a single drive source using a planar cam. Since the aperture stop ST moves along with the third lens group G3, the space is efficiently used. Also, the fourth lens group G4 performs focusing and is moved by a separate drive source from the drive source of the second and third lens groups G2 and G3.

The first lens group G1 has a meniscus shape including at least one aspheric surface sequentially from the object side O and a first lens 10 having a negative refractive power and at least one reflection optical component. In FIG. 2, an example having first and second reflection optical components 11 and 12 is shown. The first and second reflection optical components 11 and 12, for example, have reflection characteristics like a mirror or a prism. Since the path of light is changed by the first and second reflection optical components 11 and 12, the thickness of the zoom lens can be reduced. That is, the light passing through the first lens 10 is folded by the reflection optical component to bend an optical system after the reflection optical component so that the thickness of the zoom lens is reduced. Furthermore, the first lens 10 including an aspheric surface enables omission of a conventional additional lens disposed between the reflection optical component and the object side O. Thus, the thickness of the overall zoom lens can further reduced.

The second lens group G2 includes a second lens 13 having a negative refractive power and a third lens 14 having a positive refractive power. The third lens group G3 includes the aperture stop ST, a fourth lens 15 having a positive refractive power, in which a surface facing the object side O is aspheric, and fifth and sixth lenses 16 and 17 having negative refractive power and which are combined with each other. The fourth lens group G4 includes a seventh lens 18 having at least one surface that is aspheric and a positive refractive power. A cover glass 19 is provided at the image side I.

The present invention consists of four lens groups including the reflection optical component and embodies a reduced size zoom lens efficiently using the amount of movement of each lens group. Also, the present invention embodies a folding type inner zoom with an ultra-compact zoom lens so that the thickness and the length of the zoom lens is reduced. Thus, the zoom lens according to the present invention can be appropriately used for not only digital cameras but also personal mobile devices. The operation of each lens group will now be described in detail.

Since the first lens group G1 has a negative refractive power, during the change of magnification from a wide angle position to a telephoto position, the movement traces of the second and third lens groups partially overlap so that an efficient use of space is possible. Also, during zooming or magnification from a wide angle position to a telephoto position, the first lens group G1 is fixed while the second lens group G2 is close to the image side I of the first lens group G1 and moves to the image side I and then moves to the object side O to be close to the image side I of the first lens group G1. The third lens group G3 is located at the object side O of the fourth lens group G4 and moves toward the object side O during zooming or magnification to be close to the image side I of the second lens group G2.

The third lens group G3 moves within the following movement distance range during zooming or magnification from a wide angle position to a telephoto position.

$$0.22 \leq ST3/OL \leq 0.25 \quad \text{[Equation 1]}$$

In Equation 1, "ST3" is the distance of movement of the third lens group G3 from a wide angle position to a telephoto position and "OL" is the overall length of the zoom lens. The overall length of the zoom lens refers to the distance from the first lens surface of the object side O to the image side I. When the movement distance is less than the lower limit of Equation 1, the movement distance of the third lens group G3 becomes very short and the efficient use of space is deteriorated so as not to contribute to the reduction of the size of the zoom lens. When the movement distance is greater than the upper limit of Equation 1, the movement distance of the third lens group G3 is too large so that there is a limit in the mechanical movement of the third lens group G3. Since the movement distance of the third lens group G3 is relatively large compared to the length of the overall zoom lens, efficient zooming or magnification is possible. The length of the zoom lens can be reduced by partially overlapping the movement space of the third lens group G3 and the movement space of the second and fourth lens groups G2 and G4.

Also, when the third lens group G3 moves, the aperture stop ST moves toward the object O so that the F number increases in the telephoto position. In a system in which the increase of F number becomes problematic, during the zooming or magnification from the wide angle position to the telephoto position, it is preferable that the size, that is, diameter of the aperture stop increases. As the diameter increases, the F number is prevented from increasing. The fourth lens group G4 moves reverse to the third lens group G3. However, since the movement distance amount of the fourth lens group G4 is considerably less than that of the third lens group G3, the overall size of the zoom lens is not affected.

The first lens group G1 has at least one aspheric surface and includes a first lens 10 and the reflection optical components 11 and 12 in a meniscus shape. The first lens 10 has a refractive index satisfying the following range.

$$1.8 < nd(L1) < 2.0 \quad \text{[Equation 2]}$$

In Equation 2, "nd(L1)" indicates a refractive index of the first lens 10. When the refractive index of the first lens 10 has a value less than the lower limit, the curvature of the lens decreases and the air gap between the lens and the reflection optical component increases so that miniaturization of the zoom lens is difficult. When the refractive index of the first lens 10 has a value greater than the upper limit, an appropriate material having a high refractive index is difficult to find. A convex surface of the first lens 10 faces the object O and is aspheric. Since the first lens 10 is formed of a high refractive index material, astigmatism and field curvature at the wide angle position are corrected. Since the first lens having a high refractive index and an aspheric surface is arranged in the first lens group G1, adding one more lens in the direction toward the image side I of the reflection optical component due to the performance of zooming can be prevented.

The second lens group G2 includes at least one plastic lens and consists of the second lens 13 having a negative refractive power and the third lens 14 having a positive refractive power. The second and third lenses 13 and 14 are combined or closely contact each other to reduce the length of the lens system.

The third lens group G3 includes the aperture stop ST located closest to the object side O, the fourth lens 15 has a positive refractive power and at least one aspheric surface, the fifth lens 16 is a double convex type, and the sixth lens 17 is a double concave type. The fourth lens 15, located at the image side of the aperture stop ST, corrects spherical aberration. The fifth and sixth lenses 16 and 17 which are combined with each other correct chromatism and have the following refractive indexes (nd(C1)) and (nd(C2)).

$$1.5 < nd(C1) < 1.7 \text{ and } 1.8 < nd(C2) < 2.0 \quad \text{[Equation 3]}$$

When the refractive index of the fifth lens 16 is less than the lower limit, costs increase and the fifth lens 16 is difficult to process using a soft material. When the refractive index of the fifth lens 16 is greater than the upper limit, there is a limit of using a material having a small dispersive value to remove chromatism. Also, when the refractive index of the sixth lens 17 is less than the lower limit, the curvature of the image side of the sixth lens 17 decreases so that miniaturization of the zoom lens becomes difficult and also processing becomes difficult. In the meantime, when the refractive index of the sixth lens 17 is greater than the upper limit, an appropriate material is difficult to find.

Also, the fifth lens 16 has symmetrical on both sides and satisfies the following condition.

$$r1(C1) = -r2(C1) \quad \text{[Equation 4]}$$

In Equation 4, "r1(C1)" denotes the curvature of the surface at the object side of the fifth lens of a double convex type and "r2(C1)" denotes the curvature of a surface at the image side.

The fourth lens group G4 includes the seventh lens 18 having at least one aspheric surface and a positive refractive power. For example, the fourth lens group G4 may be formed of a single plastic lens having both sides that are aspheric. Also, the fourth lens group G4 functions as a compensator while moving from the object side O to the image side I during zooming or magnification and moves from the image side I to the object side O during focusing. During focusing, in the telephoto position where the movement distance is great, as the third lens group G3 moves close to the image side of the second lens group G2, the fourth lens group G4 can secure a sufficient distance of movement.

Also, in the zoom lens according to the present invention, the ratio of the focal lengths in the telephoto position and the wide angle position satisfies the following condition.

$$2.5 \leq Ft/Fw \leq 3 \quad \text{[Equation 5]}$$

In Equation 5, "Ft" denotes the focal length in the telephoto position and "Fw" denotes the focal length in the wide angle position.

As described above, according to the present invention, the thickness, height, and width can be reduced to provide a highly compact zoom lens system suitable for installing in digital cameras as well as mobile phones or various personal mobile devices, by efficiently using the movement distance of each lens group during zooming or magnification of the zoom lens.

The aspheric surface in the present embodiment can be defined in Equation 6.

$$x = \frac{ch^2}{1 + \sqrt{1 - (k+1)c^2h^2}} + \quad \text{[Equation 6]}$$
$$A_4h^4 + A_6h^6 + A_8h^8 + A_{10}h^{10} + A_{12}h^{12}$$

In Equation 6, "x" denotes the distance from the apex of the lens in an optical axis direction, "h" denotes the distance in a direction perpendicular to the optical axis, "k" denotes a conic constant, "A4, A6, A8, A10, and A12" denote aspheric coefficients, and "c" denotes the reciprocal (1/r) of the radius of curvature at the apex of the lens.

The present invention includes lenses according to preferred conditions to implement the miniaturization of a zoom lens through the following embodiments according to a variety of designs. Detailed lens data of a zoom lens according to the various embodiments of the present invention is described below.

Embodiment 1

In Table 1, which corresponds to the embodiment illustrated in FIG. 2, "f" denotes the synthetic focal length of the overall zoom lens system, "Fno" denotes the F number, "2ω" denotes a viewing angle, "r" denotes the radius of curvature, "d" denotes the thickness at the center of the lens or the interval between the lenses, "nd" denotes the refractive index, "vd" denotes the Abbe number, and "ST" denotes the aperture stop.

TABLE 1 f: 4.94~13.64, Fno: 3.63~7.12, 2w: 61.6~38.3~23.6(°), magnification change ratio: 2.76

| Surface No. | Radius of curvature (r) | Thickness, distance (d) | Refractive index (nd) | Abbe number (vd) |
|---|---|---|---|---|
| *S1 | 900.0000 | 1.050 | 1.85135 | 40.1 |
| *S2 | 13.2792 | 0.767 | | |
| S3 | Infinity | 2.650 | 1.74400 | 48.0 |
| S4 | Infinity | 2.650 | 1.74400 | 48.0 |
| S5 | Infinity | Variable | | |
| S6 | −14.1440 | 0.500 | 1.62588 | 35.7 |
| S7 | 7.0460 | 1.030 | 1.84666 | 23.8 |
| S8 | 66.1220 | Variable | | |
| ST | Infinity | 0.100 | | |
| *S10 | 4.8157 | 1.330 | 1.69350 | 53.2 |
| S11 | −10.6640 | 0.114 | | |
| S12 | 5.1640 | 1.390 | 1.69350 | 53.2 |
| S13 | −5.1640 | 1.160 | 1.90366 | 31.3 |
| S14 | 2.700 | Variable | | |
| *S15 | −9.4017 | 2.130 | 1.54410 | 56.1 |

TABLE 1-continued f: 4.94~13.64, Fno: 3.63~7.12, 2w: 61.6~38.3~23.6(°), magnification change ratio: 2.76

| Surface No. | Radius of curvature (r) | Thickness, distance (d) | Refractive index (nd) | Abbe number (vd) |
|---|---|---|---|---|
| *S16 | −3.6848 | Variable | | |
| S17 | Infinity | 0.300 | 1.51680 | 64.2 |
| S18 | Infinity | | | |

Table 2 shows aspheric coefficients of the zoom lens according to the embodiment of the present invention illustrated in FIG. 2.

TABLE 2

| Aspheric coefficient | Aspheric coefficient of 1st surface (S1) | Aspheric coefficient of 2nd surface (S2) | Aspheric coefficient of 10th surface (S10) | Aspheric coefficient of 15th surface (S15) | Aspheric coefficient of 16th surface (S16) |
|---|---|---|---|---|---|
| k | 17300.419117 | −1.377582 | −0.488971 | −45.601584 | −0.029718 |
| A4 | −0.000254577 | −6.26589e−005 | −0.00102198 | −0.00814296 | 0.00244019 |
| A6 | 0.000110315 | 0.000166424 | 0.000278872 | 0.000446354 | −0.000320971 |
| A8 | −4.26531e−006 | −7.40128e−006 | −0.000164698 | −2.84411e−005 | 5.56339e−005 |
| A10 | 8.67798e−008 | 4.89538e−007 | 3.29098e−005 | −6.68066e−006 | −6.04859e−006 |
| A12 | −8.96359e−010 | −1.36208e−008 | 0 | 2.15609e−007 | 2.1423e−007 |

Table 3 shows examples of variable distances d5, d8, d14, and d16 in the wide angle position, middle angle position, and telephoto position angle in a zoom lens according to the embodiment of the present invention illustrated in FIG. 2. The aperture stop size increases from 2.78 to 2.88 and 3.08 respectively during zooming or magnification from the wide angle position to the middle and telephoto position.

TABLE 3

| Variable distance | Wide angle position | Middle angle position | Telephoto position |
|---|---|---|---|
| d5 | 0.76115 | 2.59982 | 0.76000 |
| d8 | 6.95047 | 2.47979 | 0.80000 |
| D14 | 1.92069 | 5.44262 | 9.33976 |
| d16 | 2.16744 | 1.27751 | 0.90000 |

Figure 3:
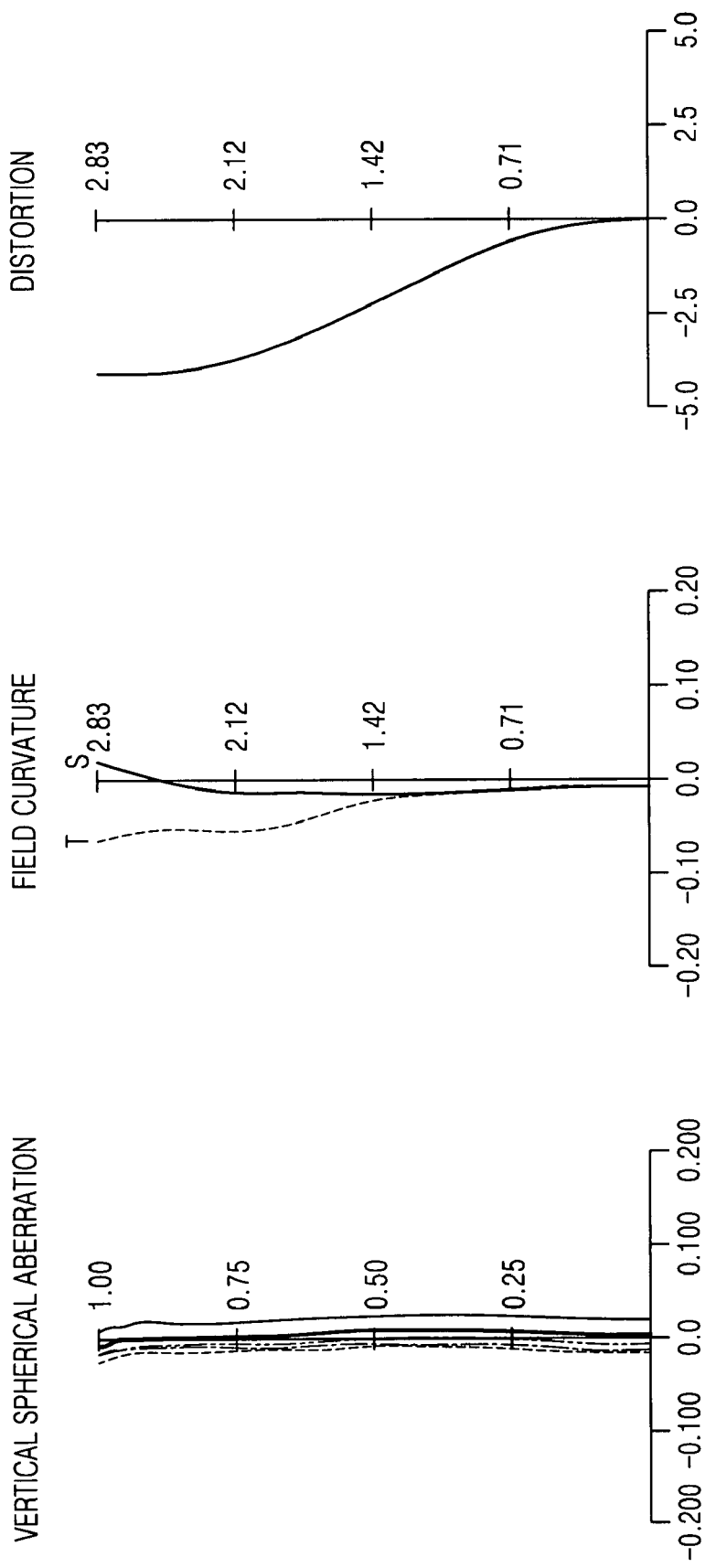
FIG. 3 is a graphical illustration showing vertical spherical aberration, field curvature, and distortion aberration in the wide angle position of the compact zoom lens according to an embodiment of the present invention.
Figure 4:
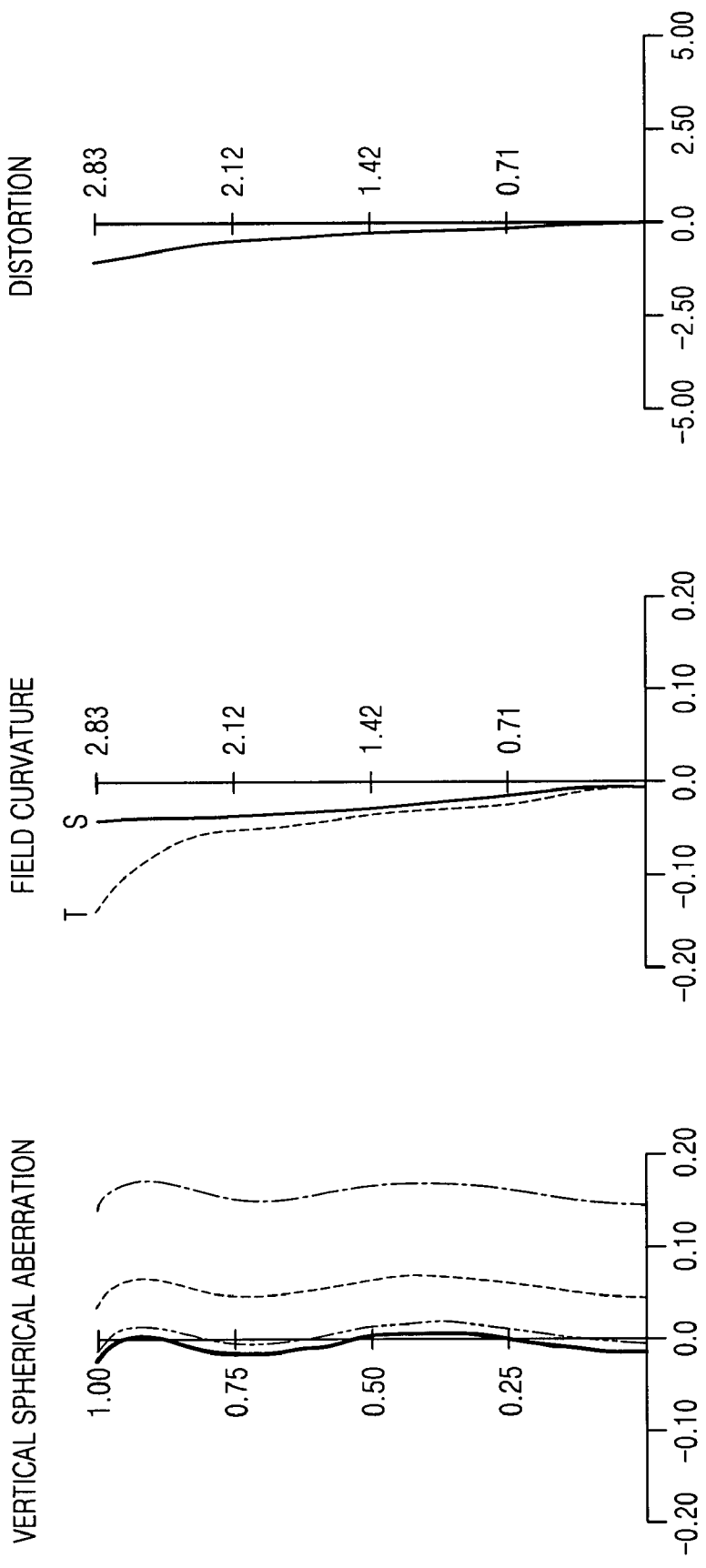
FIG. 4 is a graphical illustration showing vertical spherical aberration, field curvature, and distortion aberration in the telephoto position of the compact zoom lens according to an embodiment of the present invention.

FIGS. 3 and 4 are graphs showing vertical spherical aberration, field curvature, and distortion aberration in the wide angle and telephoto positions, respectively, of the compact zoom lens according to the embodiment of the present invention illustrated in FIG. 2. The field curvature includes tangential field curvature T and sagittal field curvature S.

Embodiment 2

Figure 5:
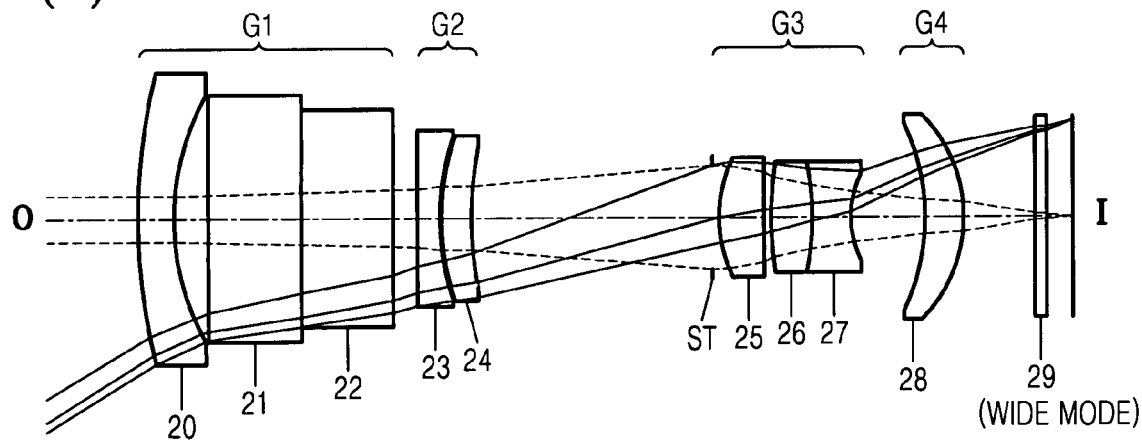
FIG. 5 are views showing the positions of lenses of a compact zoom lens according to another embodiment of the present invention in a wide angle position, a middle angle position, and a telephoto position.
Figure 5:
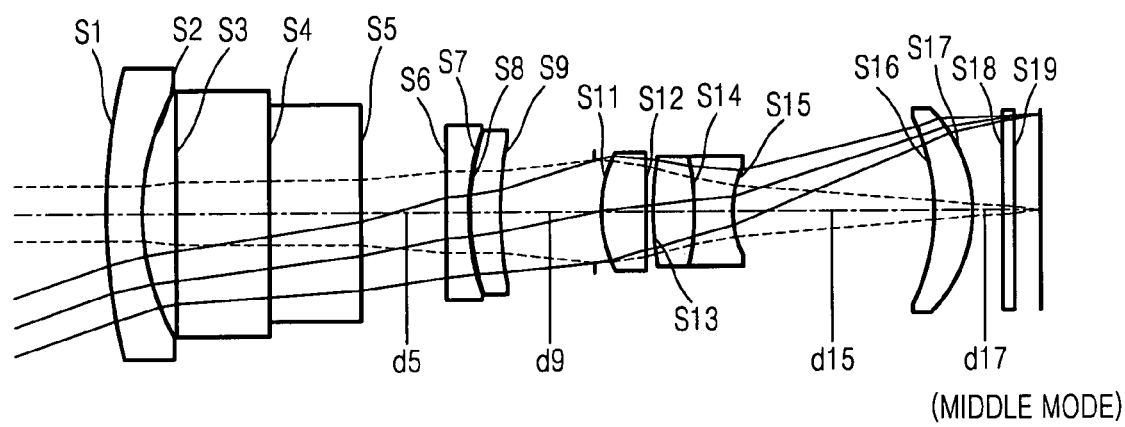
Figure 5:
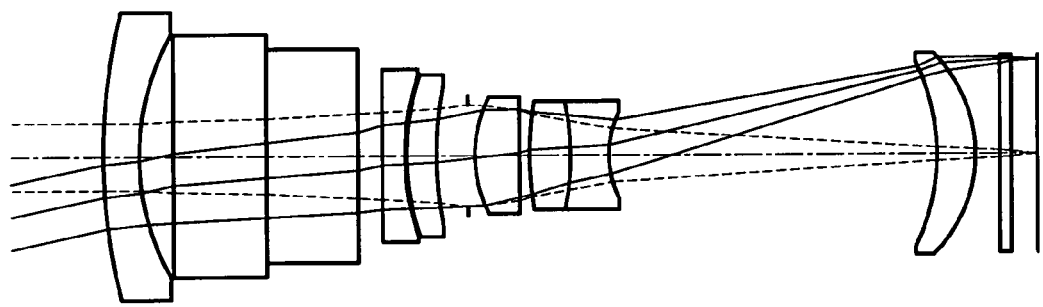

FIG. 5 shows a zoom lens system according to another embodiment of the present invention. The first lens group G1 includes a first lens 20 and first and second reflection optical components 21 and 22, the second lens group G2 includes second and third lenses 23 and 24, the third lens group G3 includes the aperture stop ST and fourth through sixth lenses 25, 26, and 27, and the fourth lens group G4 includes a seventh lens 28. The zoom lens further includes a cover glass 29.

Table 4, similar to Table 1, provides detailed lens data corresponding to the embodiment of the invention illustrated in FIG. 5.

TABLE 4 f: 4.94~13.57, Fno: 3.51~6.81, 2w: 61.5~38.6~23.8(°),
Magnification change ratio: 2.76

| Surface No. | Radius of curvature (r) | Thickness, distance (d) | Refractive index (nd) | Abbe number (vd) |
|---|---|---|---|---|
| *S1 | 224.1795 | 1.050 | 1.85135 | 40.1 |
| *S2 | 12.5843 | 1.000 | | |
| S3 | Infinity | 2.750 | 1.75500 | 52.3 |
| S4 | Infinity | 2.750 | 1.75500 | 52.3 |
| S5 | Infinity | Variable | | |
| S6 | −151.5256 | 0.600 | 1.60520 | 64.5 |
| S7 | 6.5571 | 0.050 | | |
| *S8 | 6.3449 | 0.950 | 1.83441 | 37.3 |
| *S9 | 13.2440 | Variable | | |
| ST | Infinity | 0.200 | | |
| *S11 | 3.5004 | 1.412 | 1.66547 | 55.2 |
| *S12 | −12.1752 | 0.155 | | |
| S13 | 8.9556 | 1.275 | 1.67790 | 50.7 |
| S14 | −6.3547 | 1.136 | 1.88500 | 30.1 |
| S15 | 2.9539 | Variable | | |
| *S16 | −7.6599 | 1.135 | 1.56119 | 59.1 |
| *S17 | −3.9072 | Variable | | |
| S18 | Infinity | 0.3 | 1.51680 | 64.2 |
| S19 | Infinity | | | |

Table 5 shows aspheric coefficients of the zoom lens according to the embodiment of the present invention illustrated in FIG. 5.

TABLE 5

| Spherical surface | Aspheric coefficient of 1st surface (S1) | Aspheric coefficient of 2nd surface (S2) | Aspheric coefficient of 8th surface (S8) | Aspheric coefficient of 9th surface (S9) |
|---|---|---|---|---|
| | 40.000000000116 | 9.6147728494404 | −0.40666202564729 | 6.7509940311043 |
| 4 | 0.0011095798224445 | 0.0010336863478714 | 9.49542222877e−005 | −0.00077489981712563 |
| 6 | 0.00013205354409339 | 0.00021067764260974 | 3.3172606888219e−005 | 5.1193292377247e−005 |
| 8 | −1.0341932190963e−005 | −1.6473395744698e−005 | −1.3313435525875e−005 | −2.8369501929906e−005 |
| 10 | 3.4385566676166e−007 | 1.3237743965155e−006 | −1.2817640324391e−006 | −4.762467031866e−007 |
| 12 | −7.1564866052391e−009 | −9.1179813250251e−008 | 0 | 1.4670674663963e−007 |

| Spherical surface | Aspheric coefficient of 11th surface (S11) | Aspheric coefficient of 12th surface (S12) | Aspheric coefficient of 16th surface (S16) | Aspheric coefficient of 17th surface (S17) |
|---|---|---|---|---|
| | 0.025377997020463 | −147.01327894372 | 6.8033573352237 | 0.64557366341489 |
| 4 | 0.00093942469518692 | −0.003013374162852 | 0.0063237123228377 | 0.0077743802350089 |
| 6 | 0.0004743472528183 | 0.0045234607585175 | −0.001040113171092 | −0.00052483984310682 |
| 8 | 7.3465928179566e−005 | −0.0010131012805784 | 0.00030826142410518 | 0.00017458818865757 |
| 10 | 3.4675108120294e−005 | 0.00024514244632724 | −5.9390162739452e−005 | −3.451685618212e−005 |
| 12 | 0 | 0 | 3.7342401812175e−006 | 2.1370074329459e−006 |

Table 6 shows examples of variable distances d5, d9, d15, and d17 at the wide angle, middle angle, and telephoto positions in the zoom lens according the embodiment of the present invention illustrated in FIG. 5.

TABLE 6

| Variable distance | Wide angle position | Middle angle position | Telephoto position |
|---|---|---|---|
| d5 | 0.72000 | 2.49380 | 0.72000 |
| d9 | 7.09926 | 2.77435 | 0.95000 |
| d15 | 2.14864 | 5.87951 | 9.66771 |
| d17 | 2.16980 | 0.99000 | 0.80000 |

Figure 6:
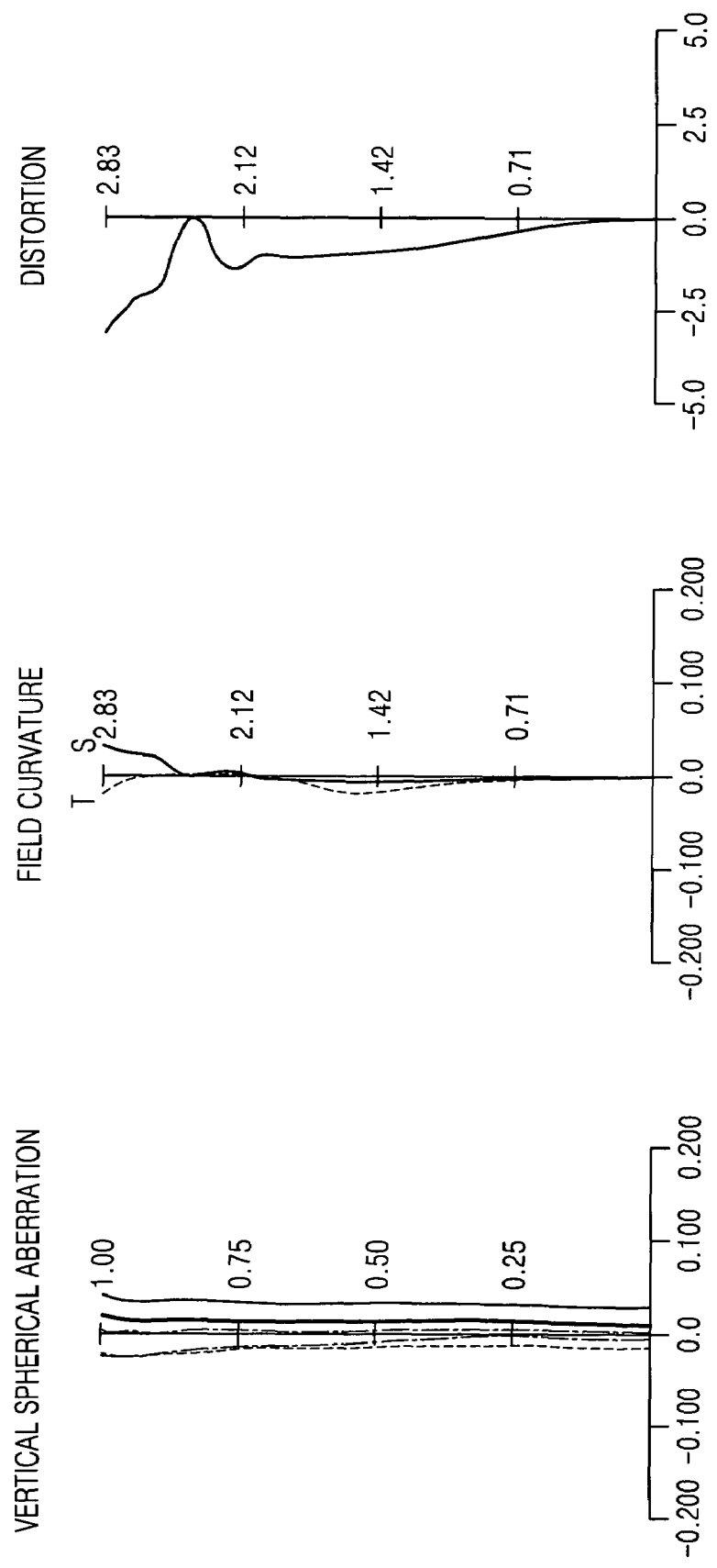
FIG. 6 is a graphical illustration showing vertical spherical aberration, field curvature, and distortion aberration in the wide angle position of the compact zoom lens according to another embodiment of the present invention.
Figure 7:
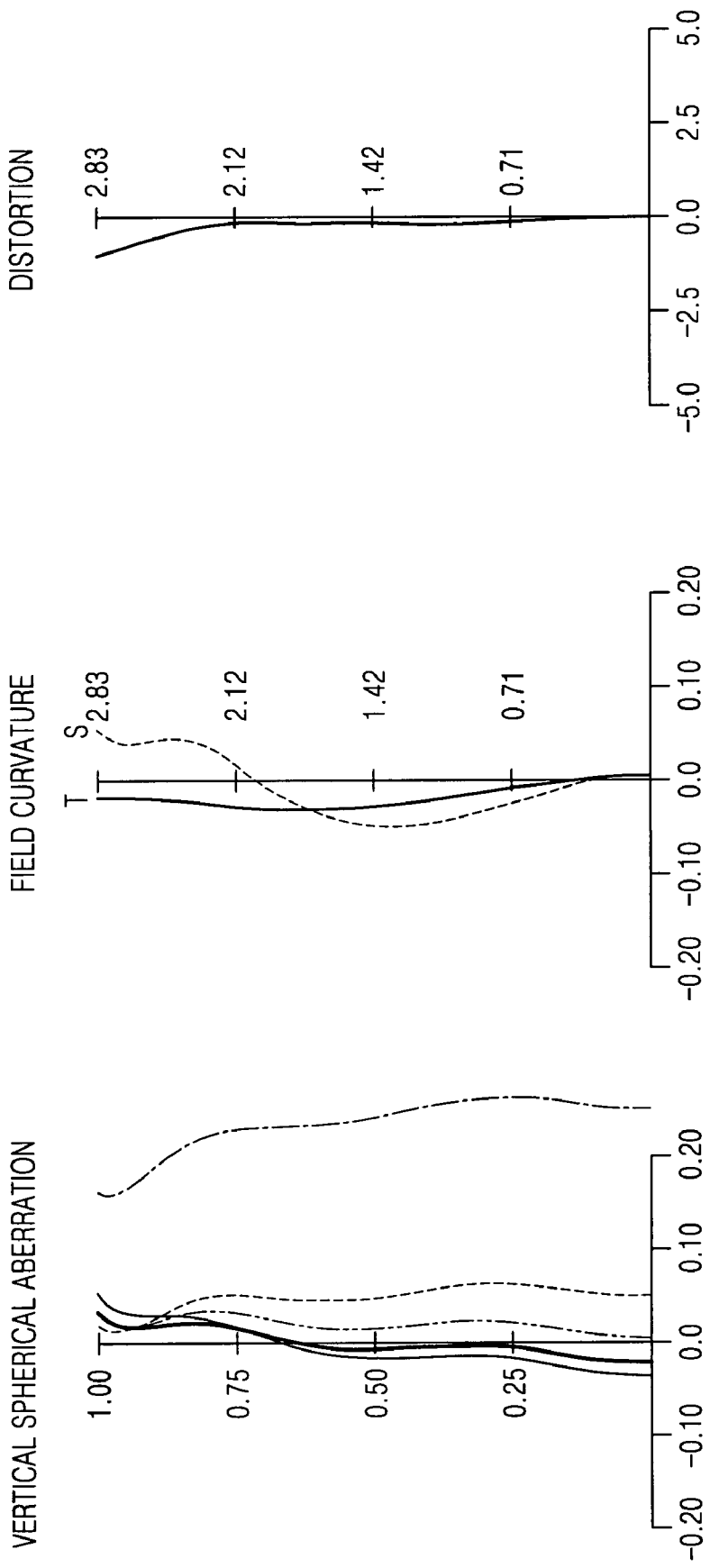
FIG. 7 is a graphical illustration showing vertical spherical aberration, field curvature, and distortion aberration in the telephoto position of the compact zoom lens according to another embodiment of the present invention.

FIGS. 6 and 7 are graphs showing vertical spherical aberration, field curvature, and distortion aberration in the wide angle position and telephoto position of the compact zoom lens according to embodiment of the present invention illustrated in FIG. 5.

Embodiment 3

Figure 8:
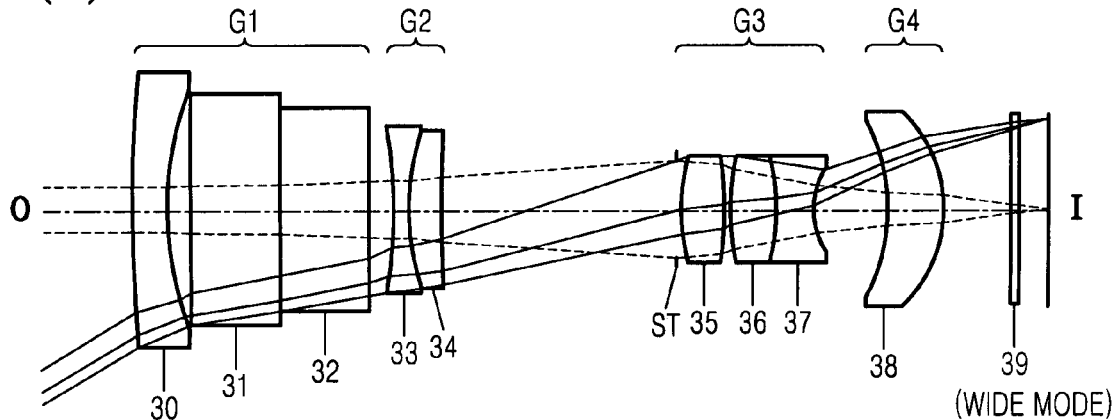
FIG. 8 are views showing the positions of lenses of a compact zoom lens according to yet another embodiment of the present invention in a wide angle position, a middle angle position, and a telephoto position.
Figure 8:
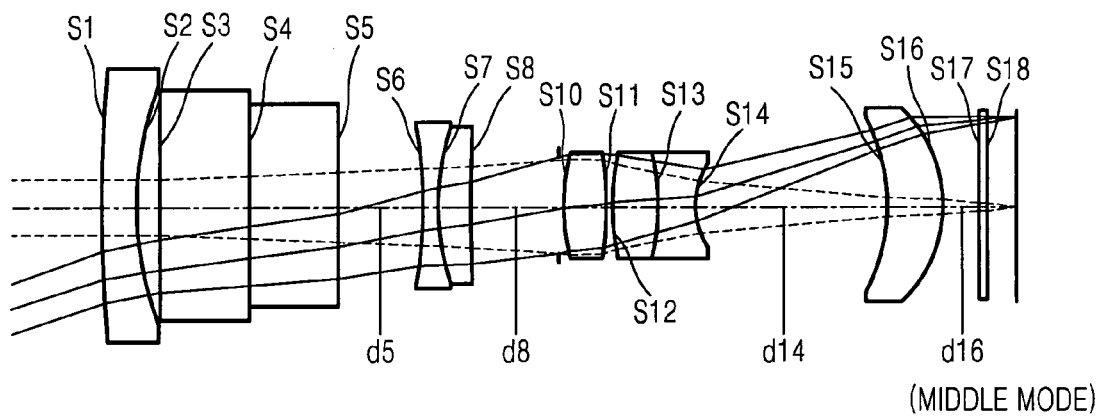
Figure 8:
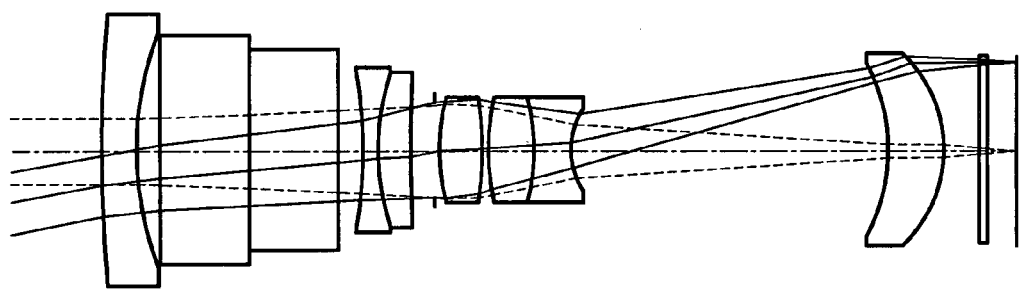

FIG. 8 shows a zoom lens system according to yet another embodiment of the present invention. The first lens group G1 includes a first lens 30 and first and second reflection optical components 31 and 32, the second lens group G2 includes second and third lenses 33 and 34, the third lens group G3 includes the aperture stop ST and fourth through sixth lenses 35, 36, and 37, and the fourth lens group G4 includes a seventh lens 38. The zoom lens further includes a cover glass 39.

Table 7, similar to Table 1, provides detailed lens data corresponding to the embodiment of the invention illustrated in FIG. 8.

TABLE 7 f: 5.10~14.08, Fno: 3.62~7.00, 2w: 60.0~38.9~22.5(°),
Magnification change ratio: 2.76

| Surface No. | Radius of curvature (r) | Thickness, distance (d) | Refractive index (nd) | Abbe number (vd) |
|---|---|---|---|---|
| *S1 | 477.9478 | 1.100 | 1.84763 | 33.2 |
| *S2 | 13.9344 | 0.743 | | |
| S3 | Infinity | 2.800 | 1.74397 | 44.8 |
| S4 | Infinity | 2.800 | 1.74397 | 44.8 |
| S5 | Infinity | Variable | | |
| S6 | −13.4051 | 0.500 | 1.62593 | 56.3 |
| S7 | 7.9970 | 1.028 | 1.83526 | 26.5 |
| S8 | 128.3623 | Variable | | |

TABLE 7-continued f: 5.10~14.08, Fno: 3.62~7.00, 2w: 60.0~38.9~22.5(°),
Magnification change ratio: 2.76

| Surface No. | Radius of curvature (r) | Thickness, distance (d) | Refractive index (nd) | Abbe number (vd) |
|---|---|---|---|---|
| ST | Infinity | 0.100 | | |
| *S10 | 4.9836 | 1.376 | 1.69104 | 52.6 |
| S11 | −10.6354 | 0.172 | | |
| S12 | 6.1218 | 1.479 | 1.69050 | 52.7 |
| S13 | −6.1218 | 1.199 | 1.87209 | 28.2 |
| S14 | 2.8345 | Variable | | |
| *S15 | −8.0026 | 1.789 | 1.56775 | 34.6 |
| *S16 | −3.6644 | Variable | | |
| S17 | Infinity | 0.300 | 1.51680 | 64.2 |
| S18 | Infinity | | | |

Table 8 shows aspheric coefficients of the zoom lens according to the embodiment of the present invention illustrated in FIG. 8.

TABLE 8

| Aspheric coefficient | Aspheric coefficient of 1st surface (S1) | Aspheric coefficient of 2nd surface (S2) | Aspheric coefficient of 10th surface (S10) | Aspheric coefficient of 15th surface (S15) | Aspheric coefficient of 16th surface (S16) |
|---|---|---|---|---|---|
| k | 7909.8008266541 | −3.6908736246967 | −0.82024065425668 | −3.9992105017765 | 0.13180991321823 |
| A4 | −0.00056982828749375 | −0.00035022731691947 | −0.00087360099849173 | −0.0036322101338997 | 0.0024072331897998 |
| A6 | 0.00010180407588004 | 0.000140111744965 | 0.00019901536883698 | −7.8858549077566e−005 | −0.00036430082075977 |
| A8 | −3.2500610388667e−006 | −3.9798876231906e−006 | −0.0001142083119777 | −2.6915855021026e−005 | 0.00012145258105965 |
| A10 | 4.287393741395e−008 | 1.0945802348979e−007 | 2.1716063068414e−005 | 1.9399883270012e−006 | −1.5859558619577e−005 |
| A12 | 0 | 0 | 0 | 0 | 8.4027459991724e−007 |

Table 9 shows examples of variable distances d5, d8, d14, and d16 in the wide angle, middle angle, and telephoto positions in the zoom lens according to the embodiment of the present invention.

TABLE 9

| Variable distance | Wide angle position | Middle angle position | Telephoto position |
|---|---|---|---|
| d5 | 0.75645 | 2.67995 | 0.75000 |
| d8 | 7.44045 | 2.79841 | 0.80000 |
| d14 | 2.27208 | 5.94505 | 9.89724 |
| d16 | 2.07826 | 1.12383 | 1.10000 |

Figure 9:
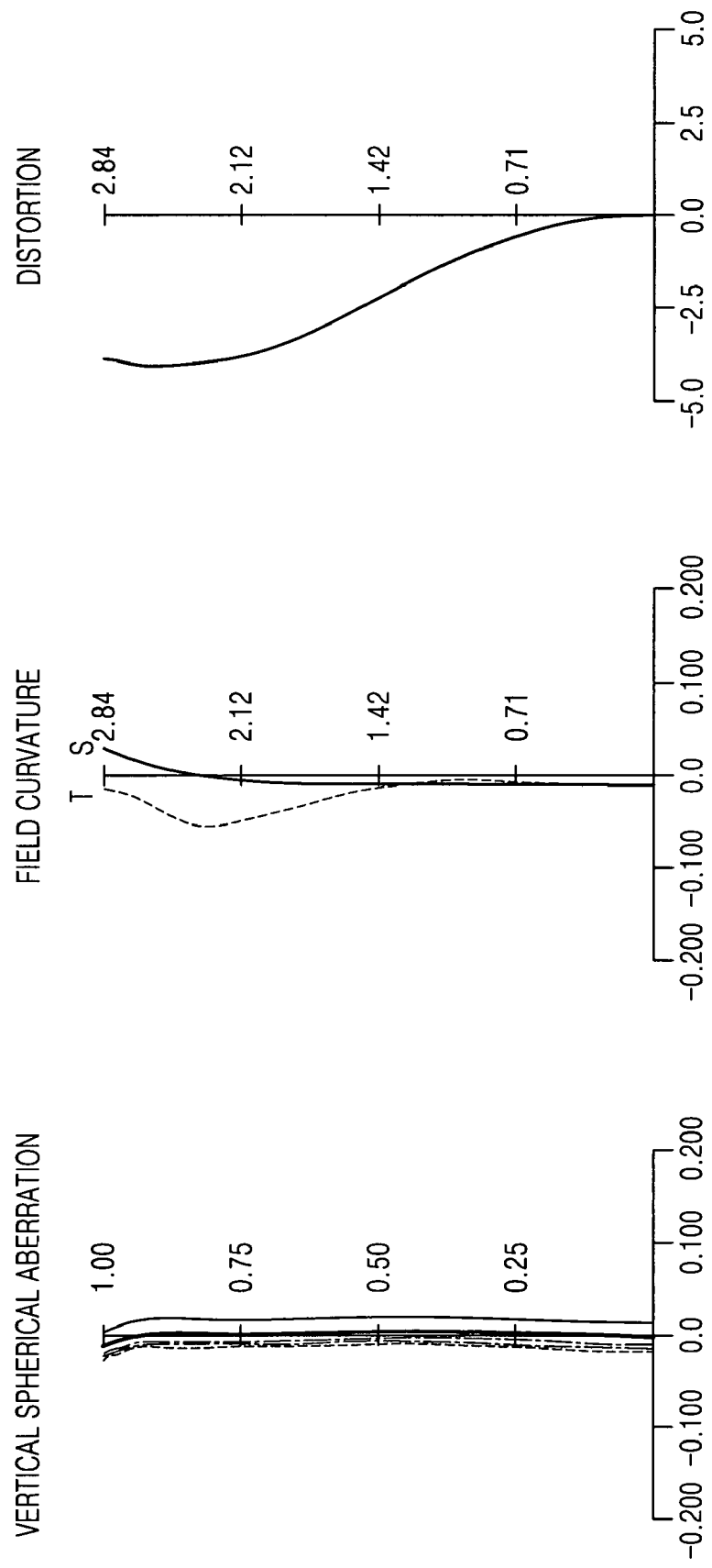
FIG. 9 is a graphical illustration showing vertical spherical aberration, field curvature, and distortion aberration in the wide angle position of the compact zoom lens according to yet another embodiment of the present invention.
Figure 10:
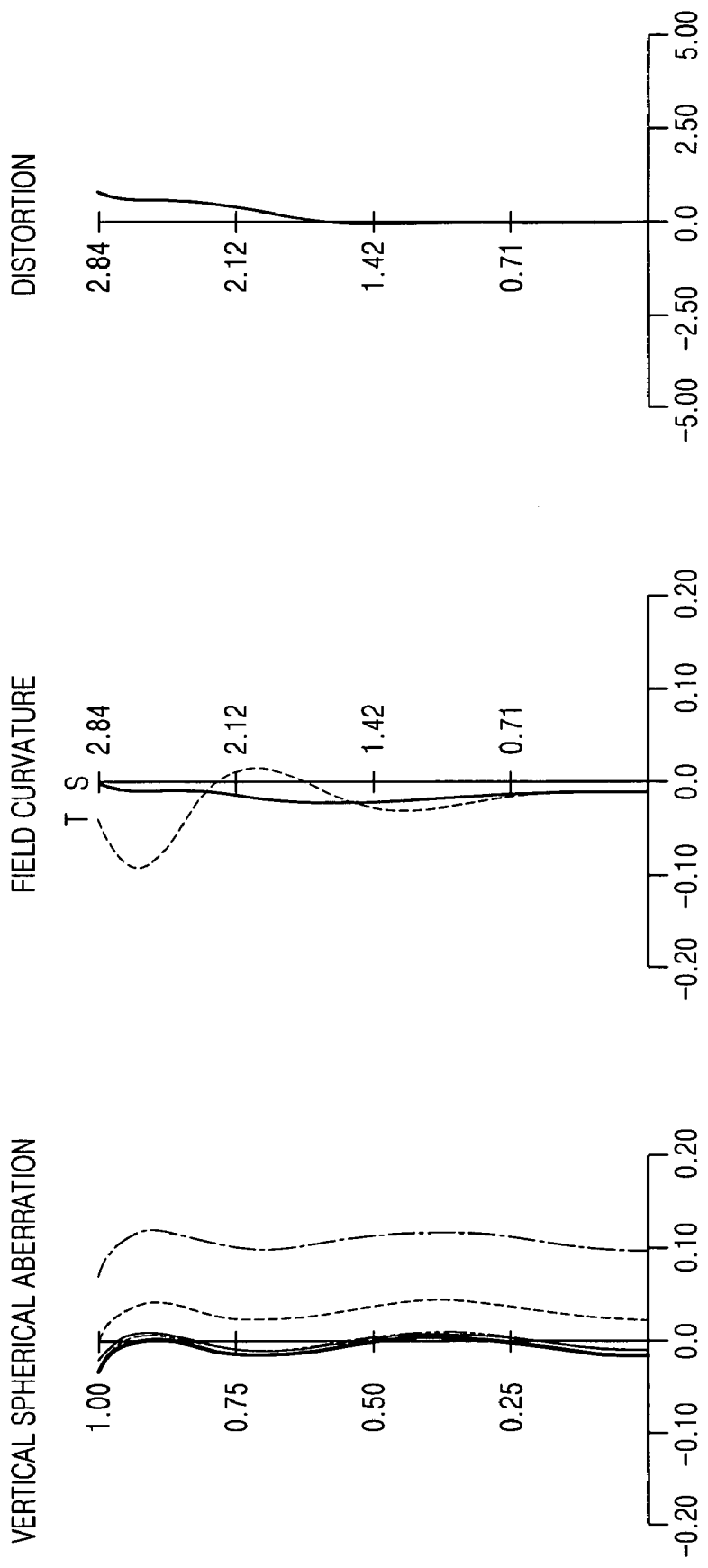
FIG. 10 is a graphical illustration showing vertical spherical aberration, field curvature, and distortion aberration in the telephoto position of the compact zoom lens according to another embodiment of the present invention.

FIGS. 9 and 10 are graphs showing vertical spherical aberration, field curvature, and distortion aberration in the wide angle and telephoto positions, respectively, of the compact zoom lens according to the embodiment of the present invention illustrated in FIG. 8.

As described above, the compact zoom lens according to the present invention includes four lens groups and embodies an ultra-compact zoom lens by efficiently using the movement distance of the respective lens groups. Also, the ultra-compact zoom lens according to the present invention embodies a folding type inner zoom to reduce not only the thickness but also the length of the zoom lens to provide a zoom lens system suitable so for digital cameras as well as personal mobile devices.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A compact zoom lens comprising first, second, third, and fourth lens groups sequentially arranged from an object side, wherein the first lens group comprises a first lens and at least one reflection optical component, at least the third lens group moves during zooming and the zoom lens satisfies the condition:

$$0.22 \leq ST3/OL \leq 0.25$$

where "ST3" is the distance of movement of the third lens group from a wide angle position to a telephoto position and "OL" is the overall length of the zoom lens.

2. The compact zoom lens of claim 1, wherein the first lens has a refractive index satisfying the following range:

$$1.8 < nd(L1) < 2.0$$

where "nd(L1)" is the refractive index of the first lens.

3. The compact zoom lens of claim 1, wherein the first lens group has a negative refractive power, the second lens group has a negative refractive power, the third lens group has a positive refractive power, and the fourth lens group has a positive refractive power.

4. The compact zoom lens of claim 1, wherein during zooming the interval between the second and third lens groups increases and the interval between the third and fourth lens groups decreases.

5. The compact zoom lens of claim 1, wherein during zooming the second, third, and fourth lens groups move.

6. The compact zoom lens of claim 1, wherein the first lens has a meniscus shape.

7. The compact zoom lens of claim 1, wherein the fourth lens group moves to perform focusing.

8. The compact zoom lens of claim 1, wherein the second lens group comprises a lens having a negative refractive power and a lens having a positive refractive power, in order from the object side.

9. The compact zoom lens of claim 1, wherein the second lens group includes at least one plastic lens.

10. The compact zoom lens of claim 1, wherein the third lens group comprises an aperture stop and a cemented lens comprised of a lens having a positive refractive power and a lens having a negative refractive power, in order from the object side.

11. The compact zoom lens of claim 10, wherein the cemented lens comprises a double convex lens and a double concave lens.

12. The compact zoom lens of claim 10, wherein the double convex lens and double concave lens respectively have the following refractive indexes of (nd(C1)) and (nd(C2)):

$1.5 < nd(C1) < 1.7$ and $1.8 < nd(C2) < 2.0$.

13. The compact zoom lens of claim 12, wherein the double convex lens satisfies the following condition:

$r1(C1) = -r2(C1)$ where "r1(C1)" is the curvature of the surface at the object side of the double convex lens and "r2(C1)" is the curvature of the surface at the image side of the double convex lens.

14. The compact zoom lens of claim 10, wherein the aperture stop of the third lens group has a diameter that increases during zooming from a wide angle position to a telephoto position.

15. The compact zoom lens of claim 10, wherein the third lens group includes an aperture stop that moves together during the zooming or magnification.

16. The compact zoom lens of claim 1, wherein the fourth lens group has a positive refractive power and comprises a plastic lens having both sides that are aspheric.

17. The compact zoom lens of claim 16, wherein the fourth lens group comprises a lens with a meniscus shape having a convex surface at the image side.

18. The compact zoom lens of claim 1, wherein the zoom lens satisfies the following condition:

$2.5 \leq Ft/Fw \leq 3$ where "Ft" is the focal length at the telephoto position and "Fw" is the focal length at the wide angle position.

19. A compact zoom lens comprising a first lens group having a negative refractive power, a second lens group having a negative refractive power, a third lens group having a positive refractive power, and a fourth lens group having a positive refractive power sequentially arranged from an object side,
wherein at least one lens group moves during zooming from a wide angle position to a telephoto position and the first lens group comprises a first lens having at least one aspheric surface on the object side and a reflection optical component, and wherein, during zooming, the second, third, and fourth lens group move.

20. A compact zoom lens comprising a first lens group having a negative refractive power, a second lens group having a negative refractive power, a third lens group having a positive refractive power, and a fourth lens group having a positive refractive power seciuentially arranged from an object side,
wherein at least one lens group moves during zooming from a wide angle position to a telephoto position and the first lens group comprises a first lens having at least one aspheric surface on the object side and a reflection optical component, and wherein the fourth lens group moves to perform focusing.

21. A compact zoom lens comprising a first lens group having a negative refractive power, a second lens group having a negative refractive power, a third lens group having a positive refractive power, and a fourth lens group having a positive refractive power sequentially arranged from an object side,
wherein at least one lens group moves during zooming from a wide angle position to a telephoto position and the first lens group comprises a first lens having at least one aspheric surface on the object side and a reflection optical component, and wherein the third lens group comprises an aperture stop and a cemented lens comprised of a lens having a positive refractive power and a lens having a negative refractive power, in order from the object side.

22. The compact zoom lens of claim 21, wherein the cemented lens is comprised of a double convex lens and a double concave lens.

23. The compact zoom lens of claim 21, wherein the double convex lens and double concave lens respectively have the following refractive indexes of (nd(C1)) and (nd(C2)):

$1.5 < nd(C1) < 1.7$ and $1.8 < nd(C2) < 2.0$.

24. The compact zoom lens of claim 21, wherein the double convex lens satisfies the following condition, $r1(C1) = -r2(C1)$ where "r1(C1)" is the curvature of the surface at the object side of the double convex lens and "r2(C1)" is the curvature of the surface at the image side of the double convex lens.

25. The compact zoom lens of claim 21, wherein the aperture stop of the third lens group has a diameter that increases during zooming from a wide angle position to a telephoto position.

26. The compact zoom lens of claim 21, wherein the third lens group includes an aperture stop that moves together during zooming.

27. The compact zoom lens of claim 21, wherein the fourth lens group has a positive refractive power and comprises a plastic lens having both sides that are aspheric.

28. The compact zoom lens of claim 27, wherein a lens of the fourth lens group comprises a lens with a meniscus shape having a convex surface at the image side.

29. The compact zoom lens of claim 21, wherein the zoom lens satisfies the following condition:

$2.5 \leq Ft/Fw \leq 3$ where "Ft" is the focal length at the telephoto position and "Fw" is the focal length at the wide angle position.

* * * * *